United States Patent
Munje

(10) Patent No.: US 8,649,391 B2
(45) Date of Patent: *Feb. 11, 2014

(54) METHODS AND SYSTEMS FOR CUSTOMIZED MULTI-APPLICATION CHANNEL CONTROL

(75) Inventor: Arun Munje, Ottawa (CA)

(73) Assignee: Blackberry Limited, Waterloo, Ontario (CA)

( * ) Notice: Subject to any disclaimer, the term of this patent is extended or adjusted under 35 U.S.C. 154(b) by 394 days.

This patent is subject to a terminal disclaimer.

(21) Appl. No.: 12/830,783

(22) Filed: Jul. 6, 2010

(65) Prior Publication Data

US 2010/0272079 A1    Oct. 28, 2010

Related U.S. Application Data

(63) Continuation of application No. 11/245,116, filed on Oct. 7, 2005, now Pat. No. 7,778,269.

(51) Int. Cl.
*H04J 3/16*    (2006.01)

(52) U.S. Cl.
USPC .......................... 370/437; 370/347; 370/442

(58) Field of Classification Search
USPC ......................................... 370/347, 437, 442
See application file for complete search history.

(56) References Cited

U.S. PATENT DOCUMENTS

| | | | | |
|---|---|---|---|---|
| 5,560,021 | A * | 9/1996 | Vook et al. | 713/323 |
| 5,625,882 | A * | 4/1997 | Vook et al. | 340/7.34 |
| 6,738,373 | B2 * | 5/2004 | Turner | 370/352 |
| 7,085,579 | B2 * | 8/2006 | Mizutani et al. | 455/512 |
| 7,126,924 | B2 | 10/2006 | Suzuki et al. | |
| 7,567,791 | B2 * | 7/2009 | Laroia et al. | 455/343.2 |
| 7,778,269 | B2 * | 8/2010 | Munje | 370/437 |
| 2002/0172178 | A1 * | 11/2002 | Suzuki et al. | 370/338 |
| 2003/0100310 | A1 | 5/2003 | Lindner et al. | |
| 2003/0235171 | A1 | 12/2003 | Lundstrom et al. | |
| 2004/0179492 | A1 | 9/2004 | Zhang et al. | |
| 2005/0009515 | A1 * | 1/2005 | Inoko | 455/426.2 |

OTHER PUBLICATIONS

Microsoft: "OnNow Pow. Mgmt. Architecture for Applications" [online] Dec. 4, 2001, pp. 1-5, XP002322895, www.microsoft.com/whdc/hwdev/tech/onnow/onnowapp_Print.mspx.

* cited by examiner

*Primary Examiner* — Phuc Tran

(57) ABSTRACT

Methods and devices are provided to aid in the control of a channel used in communicating data packets between a first communication device and a communication device with which the first communication device is communicating. For an open session occurring on the channel, the channel can be in an active state or a dormant state. Controlling when the channel is brought down to the dormant state can help improve operating conditions such as battery life of a communication device. Time-out parameters associated with the communication device, each open session and packets being sent and received on the channel are used in determining when the channel is brought up to the active state or brought down to the dormant state.

20 Claims, 6 Drawing Sheets

METHODS AND SYSTEMS FOR CUSTOMIZED MULTI-APPLICATION CHANNEL CONTROL

RELATED APPLICATIONS

This application is a continuation of U.S. patent application Ser. No. 11/245,116 filed on Oct. 7, 2005, which is hereby incorporated by reference in its entirety, and claims the benefit thereof.

FIELD OF THE APPLICATION

The application relates to channel control in communication sessions, in particular to when a communications channel is active or dormant.

BACKGROUND

In some packet-based communications protocols, in an open data session between two communication devices, there is an active state where a communication channel is "up" and is capable of sending and receiving packets and a dormant state where the communication channel is "down", but one of the two communication devices maintains the open session. When the communication channel is in the active state there is often a default time period after the expiry of which the communication channel is brought down.

In a communication device that is not strictly always-on, but has multiple sessions open, some of which are for always-on applications and others that are for intermittent applications, the timer may not be capable of taking into account the differences in the operation of the always-on and intermittent applications. If the timer is set based on a particular application's operation this can result in sessions for other applications being shut down prematurely before the other applications have completed sending or receiving packets resulting in missed services. In the case of a communication device that is both voice and data enabled, in some situations when a channel is up, the active channel state pre-empts the ability for the wireless device to receive and process voice signals. These types of problems can adversely effect the quality of service as perceived by the user of the communication device.

Keeping a channel of an external connection active or bringing up a channel from a dormant state can be an "expensive" activity. Expensive in the context of a physical quality such as battery life of a battery used in the communication device or the amount of time consumed in bringing up the channel from a dormant state. For example, bringing up a channel that has just gone dormant may take more time then if the channel had been allowed to stay up a somewhat longer period of time. However, leaving the channel active for too long a period of time has a detrimental effect on the battery life of the communication device. Therefore, it would be advantageous to reach a balance in keeping the expense of operating the device low while at the same time not sacrificing quality of service.

BRIEF DESCRIPTION OF THE DRAWINGS

Preferred embodiments will now be described with reference to the attached drawings in which.

DETAILED DESCRIPTION OF THE PREFERRED EMBODIMENTS

According to an aspect of the application, there is provided a method in a wireless device comprising: opening a communication session for an application operating on the wireless device, the communication session being established on a data channel for communicating a packet between the application of the wireless device and a device with which the wireless device is communicating, wherein the data channel has an active state and a dormant state, during the opening of the communication session, the application providing a set of time-out parameters to be associated with the communication session being opened, determining when the data channel can enter the dormant state based on the set of time-out parameters and time-out parameters of any other currently open communication sessions while the data channel is in the active state, and closing the communication session when the wireless terminal is finished with the application.

According to another aspect of the application, there is provided a wireless device comprising: an application layer adapted to run an application, a radio management layer adapted to operate a data channel controller, a packet handler layer adapted to support communication of packets between the application layer and the radio management layer, while the data channel is in an active state, the data channel controller determining when a data channel can enter a dormant state depending on time-out parameters associated with at least one of the wireless device, any open communication session and a packet to be sent or received in any open communication session, wherein the time-out parameters specific to each open session are provided to the radio management layer by the application for use by the data channel controller when each respective open communication session is initially opened.

According to a further aspect of the application, there is provided a method in a wireless device comprising: in an open communication session for an application operating on the wireless device, the communication session occurring on a data channel for communicating a packet between the wireless device and a device with which the wireless device is communicating, determining when to send a packet on a data channel depending on a time-out parameter associated with at least one of the wireless device, an open communication session and the packet, wherein the time-out parameter is provided by the application during opening of the communication session.

Figure 1:
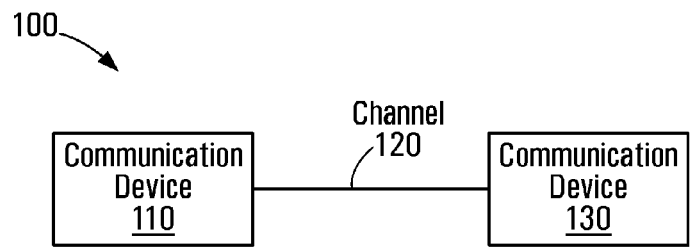
FIG. 1 is a block diagram of a generic communication system used in implementing embodiments of the application.

FIG. 1 illustrates a generic communication system, generally indicated as 100. A first communication device 110 is communicating over a channel 120 with a second communication device 130. As described above, an open data session between the first communication device 110 and the second communication device 130 with which the first device 110 is communicating may have an active state where the channel 120 is "up" and is capable of sending and receiving packets and a dormant state where the channel 120 is "down" and does not send or receive packets, but the first communication device 110 maintains the open session. Examples of the first communication device 110 are wireless devices such as a cellular telephone, wireless modem enabled computer or wireless enabled PDA, or wired devices such as a landline modem enable computer or a landline VoIP telephone. The channel 130 may be a wireless channel, a wired channel such as a landline, or a combination of a wireless channel connected at some location, for example a base station to a wired channel. The second communication device 120 may be any type of communication device with which the first communication device 110 communicates by sending or receiving voice or data information.

In some wireless protocols there is a provision for what is known as "fast dormancy", which allows the channel of a wireless device to enter the dormant state before the default time-out expires. In the dormant state, while no data is being sent or received, the wireless device can still be paged to receive a packet or send a packet, at which time the channel is brought up and the device receives or sends the respective packet.

Due to problems described above and the general unnecessary expense of bringing up the channel and/or maintaining the channel in an active state, it would be advantageous to provide control for bringing up and taking down the channel that uses some form of feedback from the always-on and/or intermittent applications.

A communication device provided by an embodiment of the application will now be described with reference to FIG. 2. The communication device, generally indicated by 18, includes an application layer 19, a packet handler layer 20 and a radio management layer 21, which in combination support a plurality of applications. The applications include intermittent applications, such as intermittent application #1 26, . . . , intermittent application #N 28 and at least one "always-on" application 22. The applications 22,26,28 each include time-out parameters 24 to be used by the radio management layer 21 for controlling the channel as will be described below.

The packet handling layer 20 is responsible for communicating packets between the applications 22,26,28 in the application layer 19 and the radio management layer 21. The radio management layer 21 is responsible for communicating packets between the communication device 18 and other devices with which the communication device 18 communicates. The radio management layer 21 is responsible for opening, closing and maintaining application communication sessions between the communication device 18 and other devices with which the communication device 18 communicates. Communication sessions may include data sessions or voice sessions. In opening a data session, the radio management layer 21 provides a link to a data channel over which packets can be communicated.

Data Channel Controller 30 is located in the radio management layer 21. The Data Channel Controller 30 is a centralized mechanism including channel control logic for the radio management layer 21 to make real-time custom determinations based on all active data sessions occurring on the device. The Data Channel Controller 30 uses parameters specific to the communication device 18, specific to open communication sessions between the communication device 18 and another device with which it communicates, and/or specific to packets being received or transmitted by the communication device, in order to make decisions regarding the status of the data channel. Parameters that are specific to the communication session to be opened are therefore specific to the application associated with the session. Time-out parameters 24 are provided to the radio management layer 21 by an application when a session for the application is opened. As such, the parameters specific to the application are enabled at run-time for the open session specific to the application. In some embodiments, when a session is closed, parameters associated with the closed session are removed so that only parameters associated with applications having currently open sessions are maintained by the radio management layer 21. This is different than the radio management layer 21 requiring prior knowledge of parameters for all applications running, or to be run, on the communication device 18 and continuously maintaining these parameters for all applications, whether the applications have an open session or not, and applying the continuously maintained parameters when the applications do have an open session. In this manner, in the embodiments described herein, the radio management layer 21 does not need to maintain the parameter information for all applications adapted to run on the communication device 18. The applications provide parameter information to the radio management layer 21 when they are to be used. This functionality aids in allowing the radio management layer 21 to control the data channel based on all the currently open data communication sessions and to ensure that the data channel usage is optimized with respect to all sessions, but the optimization does not negatively impact any of the sessions. For example, the data channel is left active only as long as an open session parameter defines that it should, but does force the data channel to go dormant if an open session parameter from another open session desires the data channel to remain active.

It is to be understood that the communication device 18 would also include the remainder of the functionality necessary for such a device to operate. Only the bare minimum functionality required to describe the embodiment has been shown. Typically the always-on application 22 and intermittent applications 26,28 are implemented in software but hardware implementations are not to be ruled out. The packet handling layer 20 and the radio management layer 21, including the Data Channel Controller 30 may be implemented in software or hardware or a combination of hardware and software.

Programmable code used in the software implementation of any of the application layer 19 including the applications 22,26,28, the packet handling layer 20 and the radio management layer 21, including the Data Channel Controller 30 may be stored on any type of computer useable medium used in communication devices. For example, the programmable code may be stored in a memory and run on a processor adapted to run the code in the communication device 18 or a DSP chip may be encoded to implement the desired functionality. Hardware implementation may utilize devices such as field programmable gate arrays (FPGA) or application specific integrated circuits (ASIC).

An example of an always-on application 22 that might be implemented in communication device 18, in particular a wireless device includes "push" email services. Examples of intermittent applications include "pull" email, web browsing or voice services.

The radio management layer 21 has a plurality of ports. Typically these include TCP (transmission control protocol) ports and UDP (user datagram protocol) ports. For example, web browsing uses a port on TCP. Ports having particular published port numbers are often reserved for certain applications. The radio management layer 20 is typically managed by an operating system of the device (not shown).

In some embodiments, the above-introduced time-out parameters 24 relate to defining an inactivity time-out (IT) parameter value for sending or receiving packets. In some embodiments, the parameter values are used to set a timer that defines the period of time that elapses before the data channel is brought down by the radio management layer 21. For sending packets, a first parameter is defined as "Inactivity Time-out after Transmit" (ITAT). For receiving packets, a second parameter is defined as "Inactivity Time-out after Receive" (ITAR). The IT parameter value used to set the timer could be set to any one of ITAT/ITAR device parameters, ITAT/ITAR session specific parameters, or ITAT/ITAR packet specific parameters.

The ITAT/ITAR device parameters are inactivity time-out values for sending or receiving packets to or from the device. In particular embodiments, the ITAT/ITAR device parameters are considered default settings and are maximum values of the sending and receiving inactivity time-outs. These device parameters would be readily available to the radio management layer 21 as they would most likely be the same for the device for each session that is opened.

The ITAT/ITAR session specific parameters are assigned to an application to be used when a session is opened. ITAT/ITAR session specific parameter values can be changed and/or updated during an open session. When ITAT/ITAR session specific parameter values are updated, the updated specific parameters replace previous session specific parameters.

The ITAT/ITAR packet specific parameter values are set specifically for a given packet. For example, for a particular packet that is to be sent by the device it may be desirable to set the IT parameter value to the ITAT packet specific parameter to lengthen or shorten the inactivity time-out particular to that packet. If the ITAT packet specific parameter value plus a current time is greater than a time-out to which the timer is set, a new time-out is set using the ITAT packet specific parameter value. If the ITAT packet specific parameter value plus the current time is not greater than the currently set time-out, the channel control logic waits for the time-out to expire and the data channel is brought down. This will be described in more detail below.

The packet specific parameter value may also be used in packet receive situations. For example, when a packet is received the channel control logic may determine that the received packet contains information pertaining to the IT parameter value for that packet. In this case, the ITAR packet specific parameter value is used to update the current value of the IT parameter value by replacing the currently set IT parameter value with the ITAR packet specific parameter value.

In some embodiments, the IT parameter is determined by a priority hierarchy. The ITAT/ITAR device parameter values can be superseded by the higher priority ITAT/ITAR session specific parameter values and the ITAT/ITAR session specific parameter values can be superseded by the higher priority ITAT/ITAR packet parameter values. As such, the IT parameter can be updated at anytime with a parameter of higher priority.

A method of operation that could be implemented by channel control logic for a single session will now be described with respect to FIG. 3. At step 300, a session for an application is started by opening a data channel between the device and another device with which the device is communicating. Step 300 is done using any number of ways known to those in the art for initiating a channel between two communication devices that allow packets to be sent and received between the two devices. When the session is opened the application provides session specific parameters, for example the ITAR session specific parameter value, that may be used during the method described herein. The IT parameter value may default to the ITAR device parameter value or be set to the ITAR session specific parameter value. Initially the channel may be active for a period of time to allow further communication between the devices for establishing the channel, following which the channel will go down or dormant if no packets are being sent or received. Starting at step 310, it is assumed that the session is open, but the data channel is currently down. At step 310, a receive packet page is received by the device. The receive packet page is an indication that the other device with which the communication device is communicating wishes to send a packet for the device to receive. At step 320, the data channel is brought up from the dormant state to the active state and the packet for which the page was sent is received by the device. At step 330, a timer is set to a time-out value equal to a current time, t, plus the IT parameter value set in step 300. For example, the IT parameter value defaults to the ITAR device parameter value. The IT parameter value may be updated to the ITAR session specific parameter value if this is desirable when the session is opened in step 300. At step 340, the data channel remains up and the device waits for the time-out to expire. During this waiting period another packet may be received (or sent) as shown at 350. When another packet is received (or sent), at decision step 360 it is determined if the present time-out set at step 330 is greater than a new current time, t+T, plus the IT parameter value. The IT parameter is the IT parameter used to calculate the time-out in step 330 or an updated IT parameter updated since step 330. For example, the IT parameter value may be updated due to the ITAR/ITAT packet parameter value from the another packet being sent or received. If the time-out of step 330 is greater than the sum of the new current time plus the IT parameter value, then a "yes" path results in a return to step 340 to wait for the time-out to expire. If the time-out of step 330 is not greater than the sum of the new current time plus the IT parameter value, then a "no" path results going to step 330 to create a new time-out that is the new current time plus the IT parameter value. Following step 340, after the time-out has expired, the next step 370 involves bringing down the data channel from the active state to the dormant state.

The IT parameter value may be changed or updated at any time during steps 310-360. For example, if the IT parameter value initially defaults to the ITAR/ITAT device parameter value, the IT parameter value can be updated to reflect a desired session specific ITAT/ITAR parameter value or a packet specific ITAT/ITAR parameter value.

Figure 3:
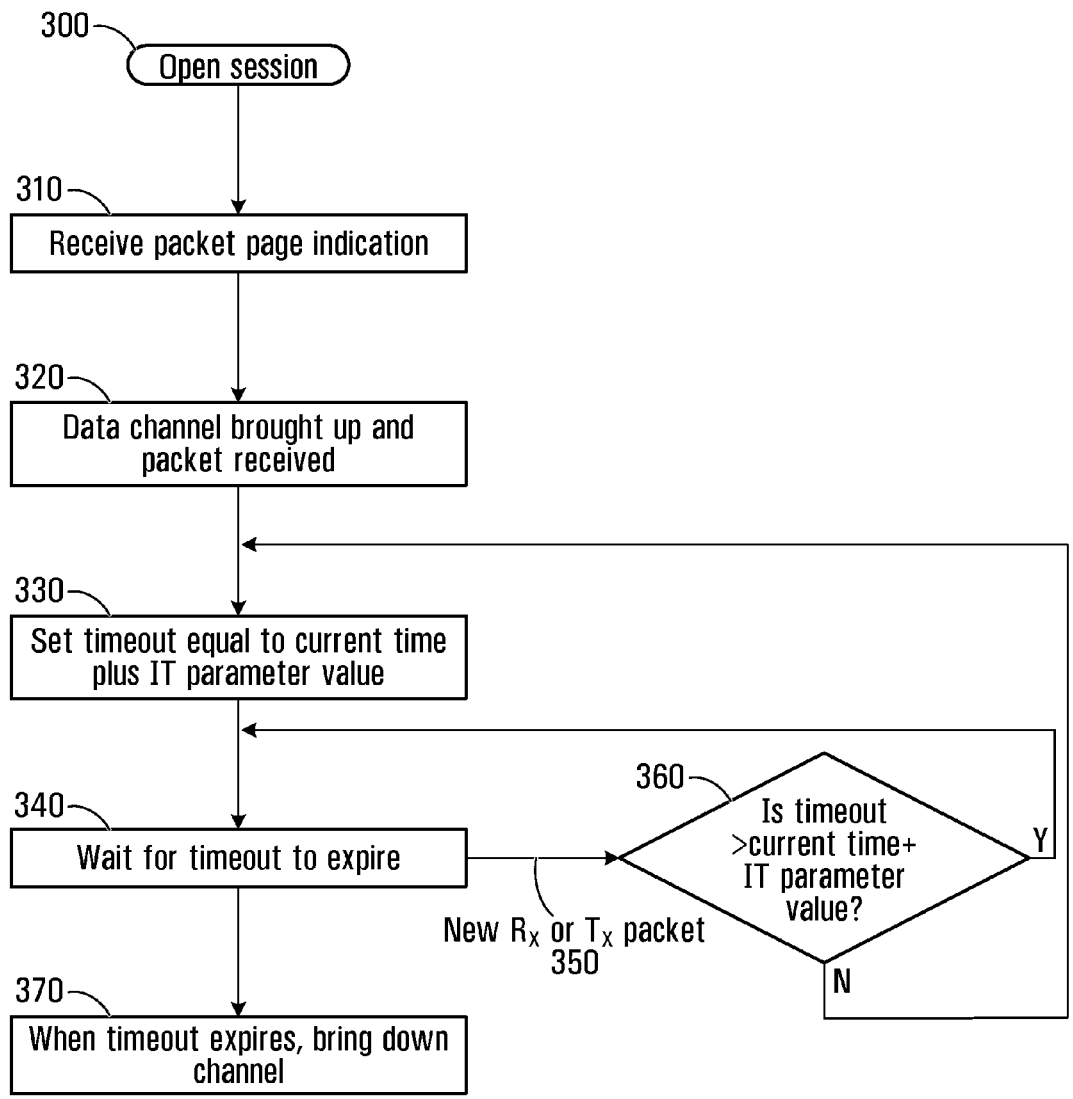
FIG. 3 is a flowchart for a method of determining a time-out value for taking down a channel having an open session after a packet is received according to an embodiment of the application.

An example of the method of FIG. 3 with values representing the various IT parameter values is included for a better understanding of the concept of the application. An ITAR device parameter value is 20 seconds. The IT parameter value is set to the ITAR device parameter value in step 300. At step 330, the time-out is set to a current time (starting reference time of 0 seconds) plus the ITAR device parameter value of 20 seconds. Therefore, the time-out at 20 seconds. If when waiting for the time-out to expire at step 340 another packet is received when the new current time is equal to 10 seconds, it is determined at step 360 whether the new current time-out equal to 20 seconds is larger than the sum of the new current time, 10 seconds, plus the IT parameter value, which has not been updated and remains as the ITAR device parameter value equal to 20 seconds. As the new current time plus the IT parameter value is equal to 30 seconds, then the "no" path is followed. The new time-out is still 20 seconds in duration and will expire when the new current time is equal to 30 seconds from the starting reference time.

In another example, the ITAR session specific parameter value is 15 seconds and the IT parameter value is set equal to the session specific ITAR parameter value instead of the ITAR device parameter value. As in the previous example, another packet is received when the new current time is equal to 10 seconds. Therefore, at step 360, the new current time plus the IT parameter value is 25 seconds, which is greater than the current time-out expiry time of 15 seconds (original starting reference time plus session specific ITAR parameter value of 15 seconds) and returning to step 330, the time-out is reset similar to the first example above.

In a further example, the IT parameter value initially defaults to the device ITAR parameter value of 20 seconds. The IT parameter value is updated after the first packet is received to the session specific ITAR parameter, which is equal to 5 seconds, from the device ITAR parameter. Another packet is received when the new current time is equal to 10 seconds. At step 360, the new current time plus the updated IT parameter value is 15 seconds, which is less than the current time-out of 20 seconds (original starting reference time plus device ITAR parameter value of 20 seconds). Therefore, the "yes" path is followed, which results in waiting for the greater time-out at 20 seconds to expire before the channel can be taken down at step 370, if no further packets are received or are designated to be sent.

A method of operation that could be implemented by the channel control logic for a single session will now be described with respect to FIG. 4. At step 400, a session is started by opening a data channel between the communication device and another device that is similar to step 300 described above. As in the method described above, it is assumed that the session is open, but the data channel is currently down. When the session is opened the application provides session specific parameters, for example the ITAT session specific parameter value, that may be used during the method described herein. At step 410 a send packet request is initiated by the communication device. The send packet request indicates that the device has a packet it desires to send to the other device to which it is communicating. At step 420, the data channel is brought up from the dormant state to the active state and the packet for which the request was initiated is sent by the device. At step 430, a timer is set to a time-out value equal to a current time, t, plus the IT parameter value. The IT parameter value could be either the ITAT device parameter value or the ITAT session specific parameter value depending on how the session is set up in step 400 or any updating of the IT parameter value that may have occurred since the IT parameter value was initially set. For example, if the IT parameter value initially defaults to the ITAT device parameter value and is updated to the ITAT session specific parameter value when the session is opened in step 400, or if the IT parameter is updated to reflect the ITAT packet specific parameter value when the packet is sent at step 420. At step 440, the data channel remains up and waits for the time-out to expire. During this waiting period another packet may be sent (or received) as shown at 450. When another packet is sent (or received), at decision step 460 it is determined if the current time-out set at step 430 is greater than a new current time, t+T, plus the IT parameter value. The IT parameter value is the IT parameter value used to calculate the time-out in step 430 or an updated IT parameter value updated since step 430. For example, the IT parameter value may be updated due to a packet specific parameter value from the another packet being sent or received. If the time-out of step 430 is greater than the sum of the new current time plus the IT parameter value, then a "yes" path results in a return to step 440 to wait for the time-out to expire. If the time-out of step 430 is not greater than the sum of the new current time plus the IT parameter value, then a "no" path results going to step 430 to create a new time-out that is the new current time plus the IT parameter value. Following step 440, after the time-out has expired, the next step 470 involves bringing down the data channel from the active state to the dormant state.

Figure 4:
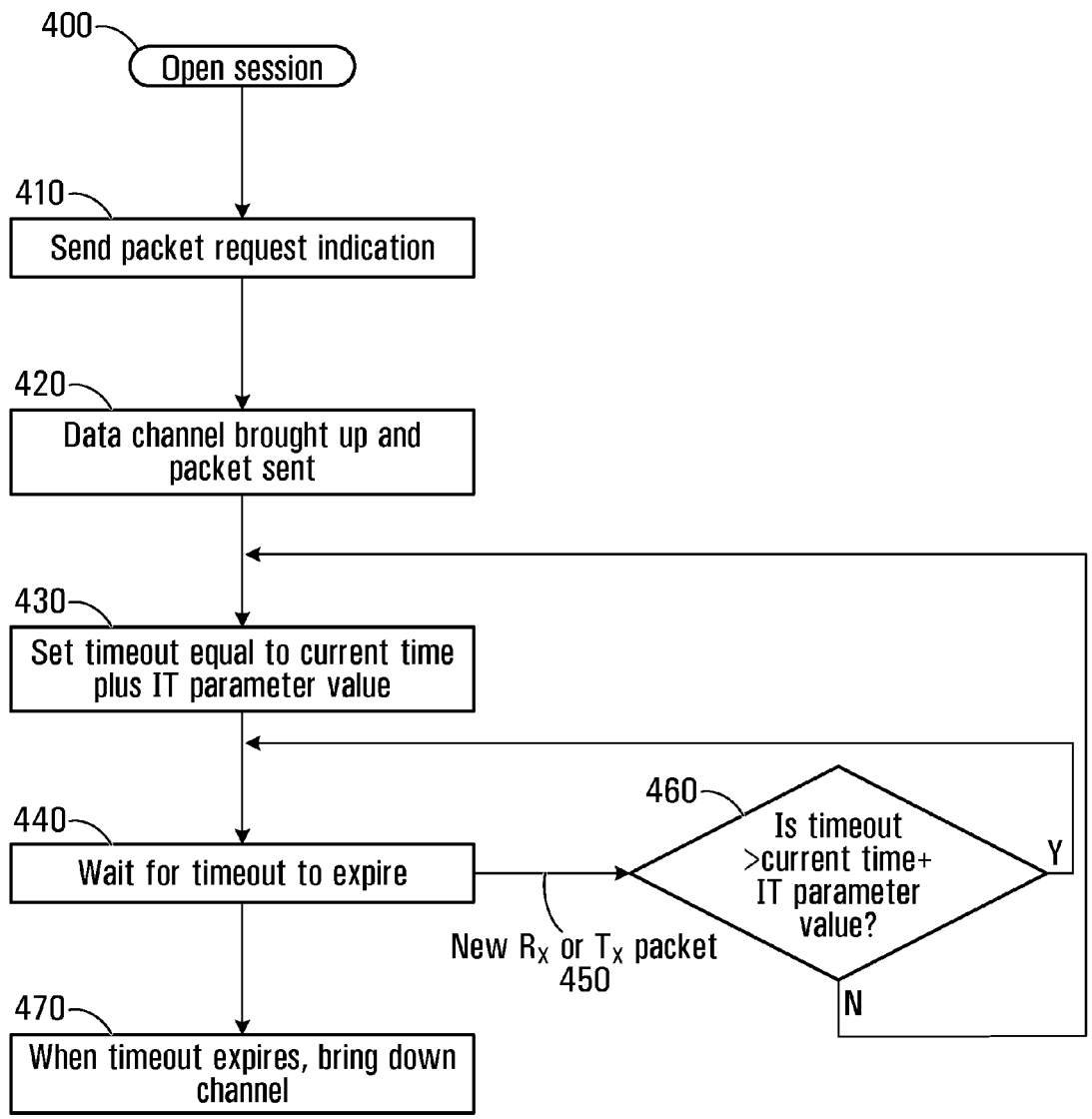
FIG. 4 is a flowchart for a method of determining a timeout value for taking down a channel having an open session after a packet is sent according to an embodiment of the application.

The three examples described above for the method described in relation to FIG. 4 also essentially apply to the method of FIG. 3 as well, except that the initial packet being communicated is being sent instead of received.

In a further example, the ITAR device parameter value is set equal to 20 seconds and the IT parameter value defaults to the ITAR device parameter value at step 400. At step 430, the time-out is set to 20 seconds. If when waiting for the time-out to expire another packet is sent when the new current time is equal to 10 seconds and has an ITAT packet parameter value set to 15 seconds, at step 460 it is determined whether the current time-out at 20 seconds is greater than the sum of the new current time, 10 seconds, plus the IT parameter value. The IT parameter is updated to reflect the higher priority of the ITAT packet parameter value, which is equal to 15 seconds. As the new current time plus the updated IT parameter value is equal to 25 seconds, the "no" path is followed and the new time-out is set based on the updated IT parameter value.

If the ITAR packet parameter value of the another packet occurring at 450 is set to 5 seconds, then the new current time plus the updated IT parameter value (10 sec+5 sec=15 sec) is less than the original 20 second time-out. In this case at step 460, since the new current time plus the updated IT parameter value is less than the original time-out, the "yes" path is followed and waits at step 440 for the original time-out to expire or more packets to be received or sent.

It is possible that the ITAR/ITAT device parameters values are shorter time-out values than the higher priority session specific or packet parameter values and as such would lengthen the wait for the time-out expiry. In such situations the higher priority hierarchy would still be maintained as described above.

When more than one session is open at a time using the same data channel for transfer of data it is important to ensure that the time-out of one session which ends before a time-out of another session does not cause the data channel to go dormant and result in the session with the greater time-out to be inadvertently cut-off before the time-out of the another session expires. The benefit of the use of the channel control logic is more easily seen in such a situation. Different sessions could conceivably have different ITAR and ITAT session specific parameter values.

A method of operation that could be implemented by the channel control logic for multiple sessions will now be described with respect to FIG. 5. At step 500, multiple sessions are started by opening a data channel between the device and another device, which is similar to step 400 described above, wherein each application has a session opened and all sessions communicate over the one data channel. The remainder of the method occurs with open sessions, but the data channel is initially down. When the session is opened the application provides session specific parameters, for example the ITAR session specific parameter value, that may be used during the method described herein. At step 510, a send packet request is initiated by the communication device for a first session. At step 520, the data channel is brought up from the dormant state to the active state and the packet for which the request was initiated is sent by the device. At step 530, a timer is set to a time-out value equal to a current time, t, plus the IT parameter. The IT parameter value could be set to either one of the ITAT device parameter value or the ITAR session specific parameter value, depending on how the sessions are set up in step 500 or any updating of the IT parameter value that may have occurred since the IT parameter value was initially set. At step 540, the data channel remains up and waits for the time-out to expire. During this waiting period a packet for a second session may be sent (or received) as shown at 550. When the packet of the second session is sent (or received), at decision step 560 it is determined if the present time-out set at step 530 is greater than a new current time, t+T, plus the IT parameter value. The IT parameter value is the IT parameter value used to calculate the time-out in step 530 or an updated IT parameter value updated since step 530. For example, the IT parameter value may be updated due to a packet specific parameter value from the another packet from the second session being sent or received. If the time-out of step 530 is greater than the sum of the new current time plus the IT parameter value, then a "yes" path results in a return to step 540 to wait for the time-out to expire. If the time-out of step 530 is not greater than the sum of the new current time plus the IT parameter value, then a "no" path results going to step 530 to create a new time-out that is the new current time plus the updated IT parameter value as described above. Following step 540, after the time-out has expired, the next step 570 involves bringing down the data channel from the active state to the dormant state.

In an example pertaining to multiple sessions as described above, a device has an ITAT device parameter value equal to 20 seconds, a first session has a first ITAT session specific parameter value equal to 15 seconds and a second session has a second ITAR session specific parameter equal to only 5 seconds. At step 500, the IT parameter value is set to the first session ITAT parameter. At step 530, the time-out is equal to 20 seconds based on the current time and the IT parameter value. At step 550, wherein the new received (or sent) packet is from the second session, the channel control logic must determine if the original time-out is larger than the value of the new current time plus the IT parameter value which is updated to be equal to the second ITAT/ITAR session specific parameter value. The original time-out is greater than the new current time plus the updated IT parameter value, so the "no" path at step 540 results in waiting for the original time-out to expire.

The IT parameter value may also be updated to reflect the ITAR/ITAT packet parameter if conditions provide that the ITAR/ITAT packet parameter is to supersede the current IT parameter based on the priority hierarchy described above.

Figure 5:
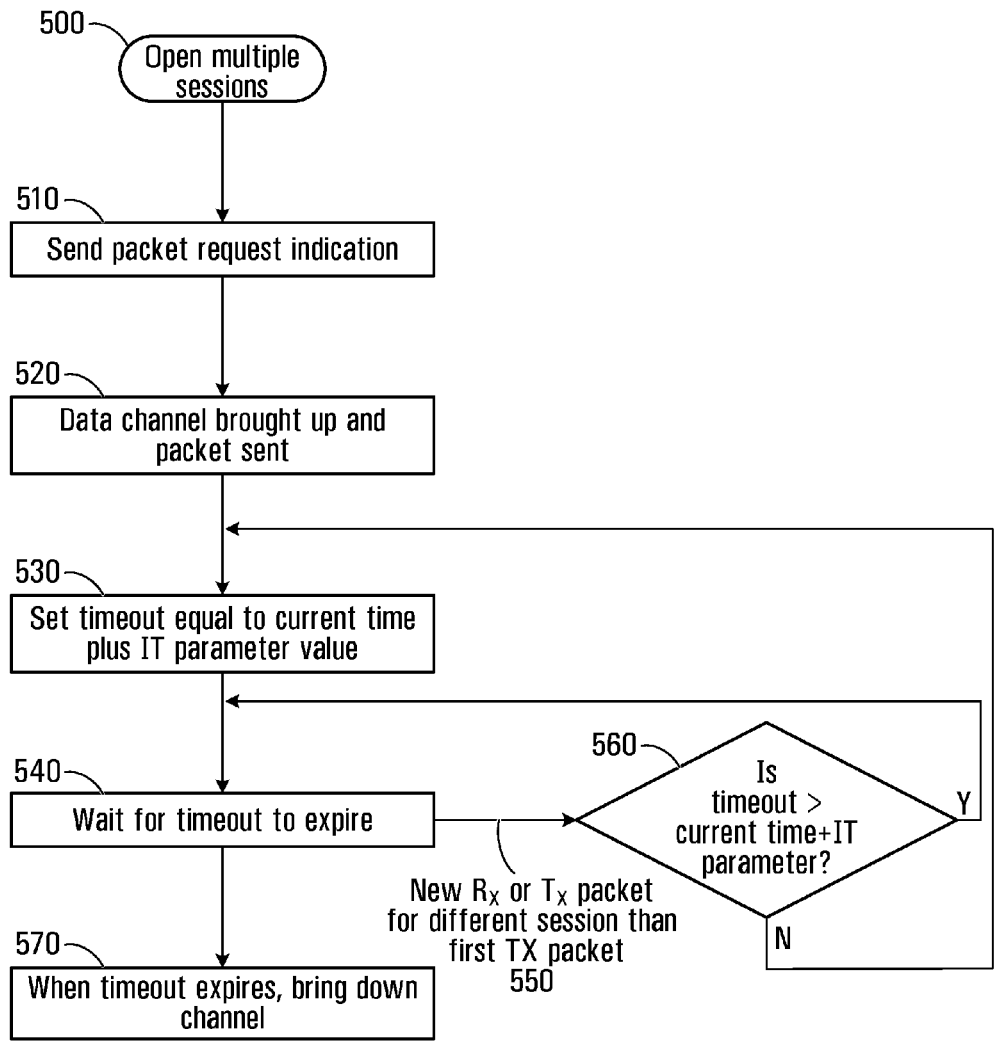
FIG. 5 is a flowchart for a method of determining a time-out value for taking down a channel having multiple open sessions after a packet is sent according to an embodiment of the application.

FIG. 5 and the above description pertain to an initial send packet condition, however it is to be understood that a similar multi-session method pertaining to an initial receive packet condition is within the scope of the application.

Another aspect of the application pertains to when packets are to be sent by the communication device sending the packets. Bringing up the channel can be delayed for sending packets by utilizing a further time-out parameter identified as "Lazy Sendout Time" (LST). The LST is a send priority time-out parameter which identifies a time period during which the send packet is delayed. A benefit provided by delaying when a packet is sent is related to conservation of battery life. In some embodiments, the LST parameter is used to set a timer in a similar manner to the inactivity time-out parameter described above. If the packet is identified as not being sufficiently important that it can wait a specified period of time to be sent, then the packet can wait to be sent until the data channel is brought up to receive a packet, send a more important packet, or send the packet when the LST time period expires if there has been no reason to bring up a data channel before that time.

Figure 6:
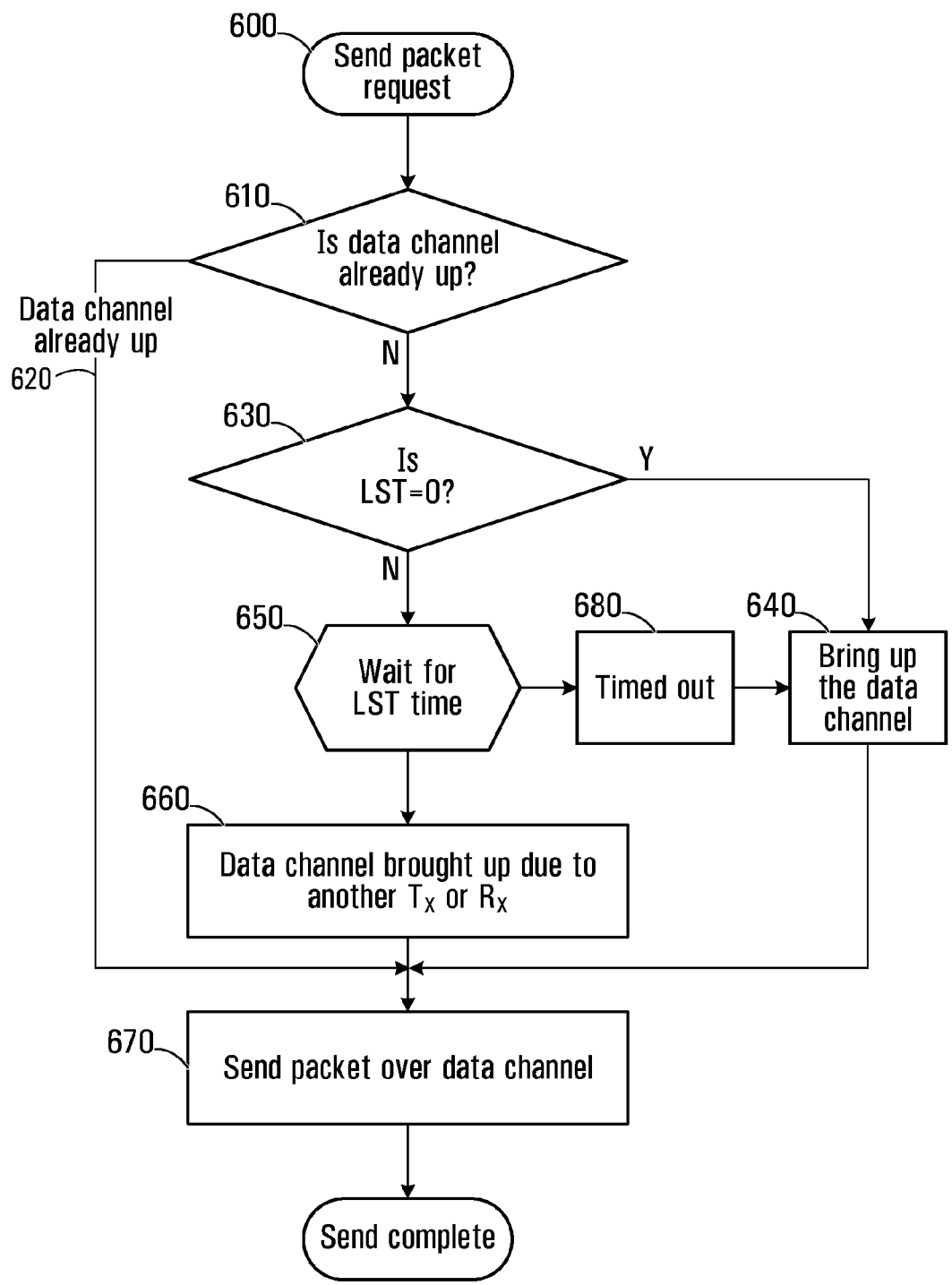
FIG. 6 is a flowchart of a method of determining when a packet is to be sent according to an embodiment of the application.

A method of operation that could be implemented by the channel control logic for utilizing the LST functionality will now be described with respect to FIG. 6. A first step 600 essentially corresponds to the send packet request step of 410 FIG. 4. When the session for which the packet is being sent is opened, the application provides session specific parameters, for example the LST session specific parameter value, that may be used during the method described herein. In step 610, it is determined if the data channel is currently up. If the data channel is already up as identified at 620, the send packet is sent over the data channel at step 670 as soon as possible. In step 630, it is determined if the LST parameter is equal to zero. If the LST is equal to zero, a "yes" path is followed and the data channel is brought up at step 640. The send packet is then sent over the data channel at step 670. If the LST is not equal to zero, a "no" path is followed which involves waiting for the LST time period to expire at step 650. While waiting for the LST to expire, if the data channel is brought up due to a receive packet or a higher priority send packet at step 660, then the send packet is sent over the data channel at step 670. If the data channel is not brought up before the expiry of the LST time period, then the LST times out at 680, the data channel is brought up at step 640 and the send packet is then sent over the data channel at step 670.

The LST parameter used to set a timer could be any one of an LST device parameter, an LST session specific parameter, or an LST packet specific parameter. In some embodiments, the LST parameter has a hierarchy priority assignment in a similar manner to the IT parameter described above. Also in a similar manner to the IT parameter described above, the LST parameter can be changed or updated at any step of the method.

Figure 2:
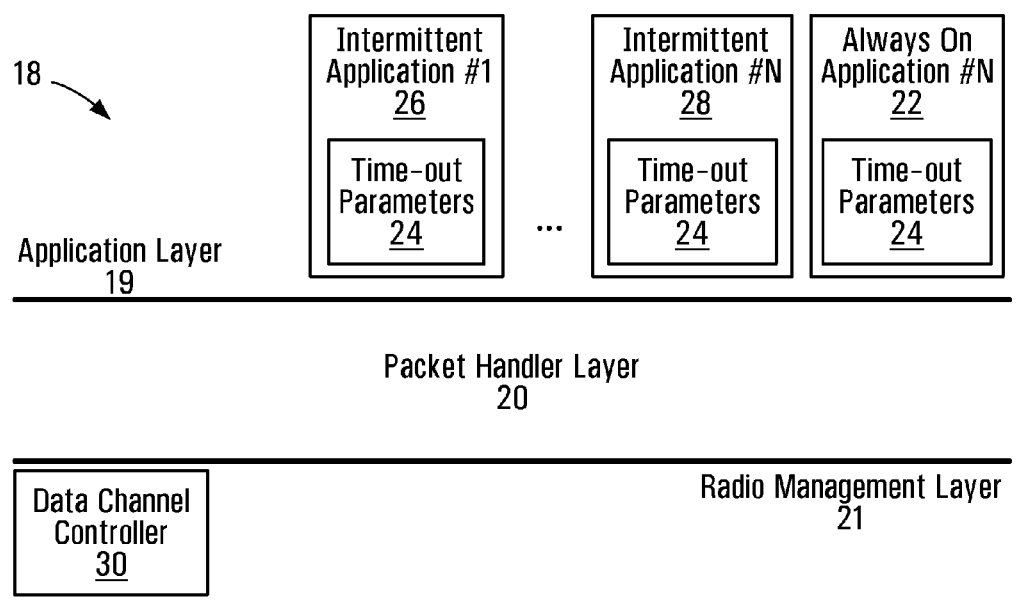
FIG. 2 is a layer view of a communication device according to an embodiment of the application.
Figure 7:
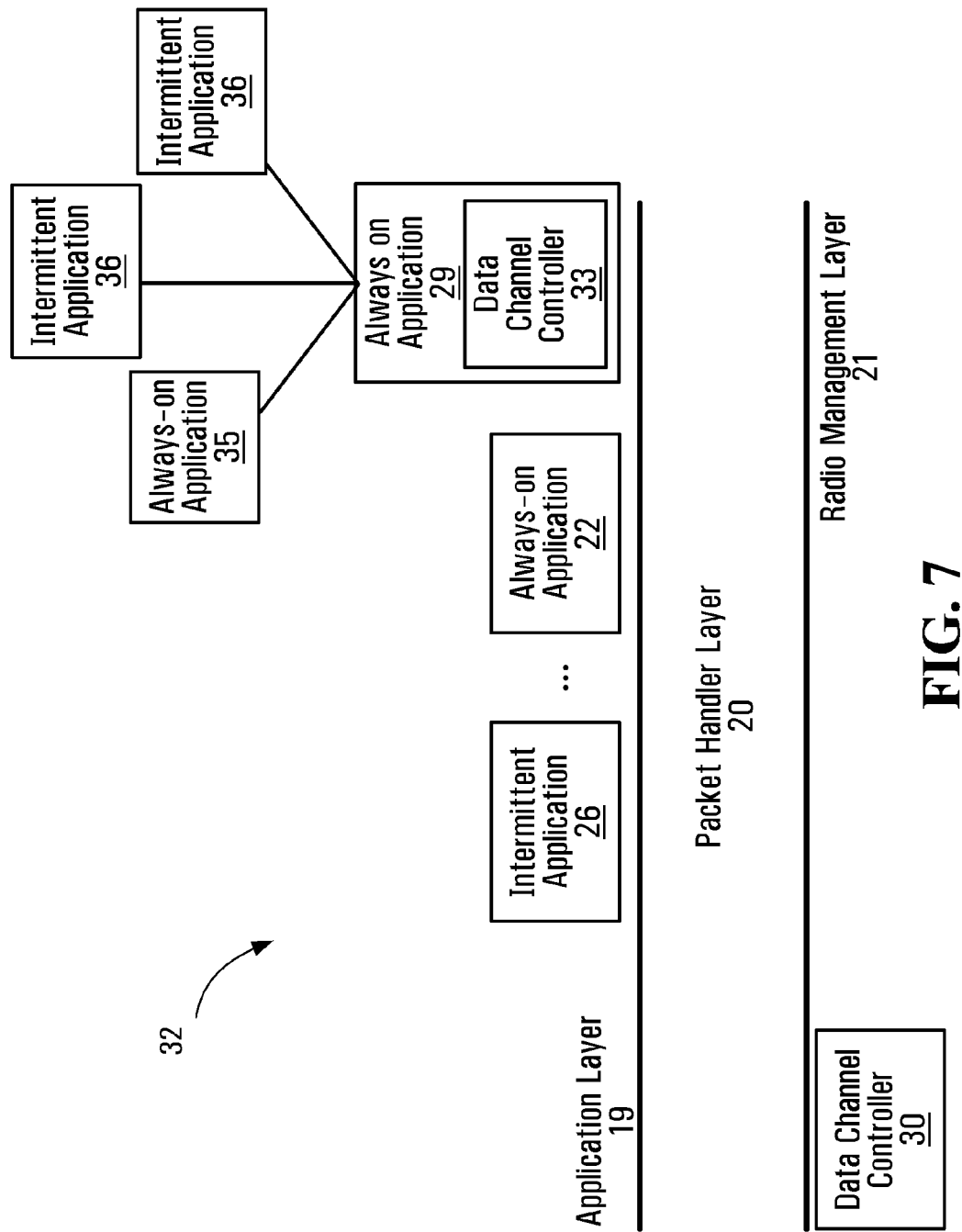
FIG. 7 is a layer view of a communication device according to another embodiment of the application.

FIG. 7 illustrates another embodiment for a communication device 32, having a similar radio management layer 21, packet handling layer 20, and application layer 19 to the device 18 of FIG. 2. However, FIG. 7 includes an always-on application 29 in the application layer that forms an interface for other always-on applications 35 or intermittent applications 36 to communicate to the packet handling layer 20 in communication device 32. In FIG. 7, only three are shown, however it is to be understood that a greater or lesser number of applications may be coupled to the always-on application 29. The always-on application 29 forming the interface includes a second Data Channel Controller 33 having similar data channel control logic to that described above located in the radio management layer 21 which is used by the always-on application 29 for control of the applications 35,36 for which it acts as the interface. In this manner the always-on application 29 can oversee multiple applications 35,36, thereby forming a single point of contact for the Data Channel Controller 30 in the radio management layer 21 for all the applications 35,36 the always-on application 29 oversees. In this manner the always-on application 29 ensures that the data channel shared by the multiple applications 35,36 is not taken down or brought up prematurely based on the relevant ITAR, ITAT and/or LST parameter information used by the second Data Channel Controller 33 in the always-on application 29. The Data Channel Controller 30 then operates in the above described manner to control the data channel for the applications 22,26,28 in the application layer 19 as well as the applications 35,36 coupled to the always-on application 29.

Numerous modifications and variations of the present application are possible in light of the above teachings. It is therefore to be understood that within the scope of the appended claims, the application may be practised otherwise than as specifically described herein.

A portion of the disclosure of this patent document contains the material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method in a wireless device comprising:
   opening a communication session on a data channel for an application operating on the wireless device, wherein the data channel has an active state and a dormant state;
   during the opening of the communication session, the application providing a set of time-out parameters to be associated with the communication session being opened for the application;
   determining a time when the data channel can be brought down to the dormant state based on the set of time-out parameters while the data channel is in the active state.

2. The method of claim 1, wherein the determining step comprises:
   receiving an indication that a packet is to be communicated on the data channel;
   sending or receiving the packet;
   setting a timer value equal to a current time plus a time-out parameter value;
   when the timer value expires, bringing down the data channel to the dormant state.

3. The method of claim 2, further comprising the data channel entering the active state if the data channel is in the dormant state following the step of receiving an indication that the packet is to be communicated.

4. The method of claim 2, further comprising:
   if an indication that a further packet is to be communicated on the data channel before the timer value expires,
   sending or receiving the further packet;
   determining if the timer value is greater than a new current time plus the time-out parameter value;
   if the timer value is greater, waiting for the timer value to expire;
   if the timer value is not greater, setting a new timer value equal to the new current time plus the time-out parameter value.

5. The method of claim 4, wherein the time-out parameter value is updated after the packet is communicated and before the further packet is communicated, resulting in the new timer value being equal to the new current time plus the updated time-out parameter value.

6. The method of claim 2, further comprising updating the time-out parameter value.

7. The method of claim 6, wherein updating the time-out parameter value comprises:
   updating the time-out parameter values with a parameter of higher priority.

8. The method of claim 2, wherein if the time-out parameter value is set equal to a device time-out parameter value, updating the time-out parameter value based on a session time-out parameter value from the set of time-out parameters associated with the open communication session for the application.

9. The method of claim 2, wherein if the time-out parameter value is set equal to a session time-out parameter value from the set of time-out parameters associated with the open communication session for the application, updating the time-out parameter value based on a packet time-out parameter value of the packet being communicated.

10. The method of claim 2, further comprising:
    determining when to send a packet from the wireless device to a device with which the wireless device is communicating on the data channel depending on a send priority time-out parameter associated with at least one of a group consisting of the wireless device, the open communication session and the packet to be sent.

11. The method of claim 1, wherein determining a time when the data channel can be brought down to the dormant state based on the set of time-out parameters comprises:
    determining a time when the data channel can be brought down to the dormant state based on the set of time-out parameters and time-out parameters of any other currently open communication sessions on the data channel.

12. The method of claim 1 wherein the application providing a set of time-out parameters to be associated with the communication session being opened for the application comprises the application providing at least one of:
    an Inactivity Time-out after transmit (ITAT) session specific parameter;
    an Inactivity Time-out after transmit (ITAT) packet specific parameter;
    an Inactivity Time-out after Receive (ITAR) session specific parameter; and
    an Inactivity Time-out after Receive (ITAR) packet specific parameter.

13. A non-transitory computer readable medium having instructions stored thereon for execution by a wireless device, the instructions comprising channel control logic adapted to implement the method of claim 1.

14. A method in a wireless device comprising:
    opening a communication session on a data channel for an application operating on the wireless device, wherein the data channel has an active state and a dormant state;
    during the opening of the communication session, the application providing a set of time-out parameters to be associated with the communication session being opened for the application;
    during the open communication session, determining when to send a packet on a data channel depending on a send priority time-out parameter from the set of time-out parameters associated with at least one of a group consisting of the wireless device, the open communication session and the packet.

15. The method of claim 14, wherein the determining step comprises:
    determining if the data channel is in the active state or the dormant state;
    if the data channel is in the active state, sending the packet as soon as possible;
    if the data channel is in the dormant state, determining if the send priority time-out parameter value is equal to zero;
    if the send priority time-out parameter value is equal to zero, bringing up the data channel to the active state and sending the packet as soon as possible;
    if the send priority parameter value is not equal to zero, waiting for the send priority time-out parameter value to expire and when the send priority time-out parameter value does expire, bringing up the data channel to the active state and sending the packet as soon as possible.

16. The method of claim 15, wherein while waiting for the send priority time-out parameter value to expire the data channel is brought up to the active state due to another packet being communicated over the data channel and once it is determined that the data channel has entered the active state, sending the packet as soon as possible.

17. The method of claim 14, further comprising updating the send priority time-out parameter.

18. The method of claim 14, wherein:
   if the send priority time-out parameter value is set equal to a device send priority time-out parameter value, updating the send priority time-out parameter value based on a session send priority time-out parameter value from the set of time-out parameters associated with the open communication session for the application; or
   if the send priority time-out parameter value is set equal to a session send priority time-out parameter value from the set of time-out parameters associated with the open communication session for the application, updating the send priority time-out parameter value based on a packet send priority time-out parameter value of the packet being communicated.

19. The method of claim 14 wherein the application providing a set of time-out parameters to be associated with the communication session being opened for the application comprises the application providing at least one of:
   an Inactivity Time-out after transmit (ITAT) session specific parameter;
   an Inactivity Time-out after transmit (ITAT) packet specific parameter;
   an Inactivity Time-out after Receive (ITAR) session specific parameter;
   an Inactivity Time-out after Receive (ITAR) packet specific parameter; and
   a Lazy Sendout Time (LST) parameter.

20. A non-transitory computer readable medium having instructions stored thereon for execution by a wireless device, the instructions comprising channel control logic adapted to implement the method of claim 14.

* * * * *